I. BROOK.
ANTISKIDDING CHAIN.
APPLICATION FILED AUG. 28, 1917.

1,282,182.

Patented Oct. 22, 1918.
2 SHEETS—SHEET 1.

Inventor
Irvine Brook
By
his Attorney

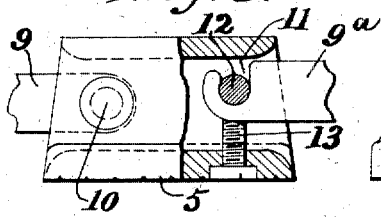
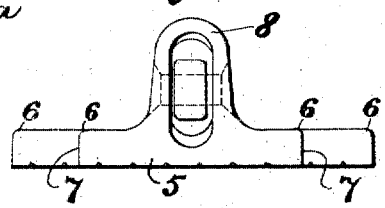
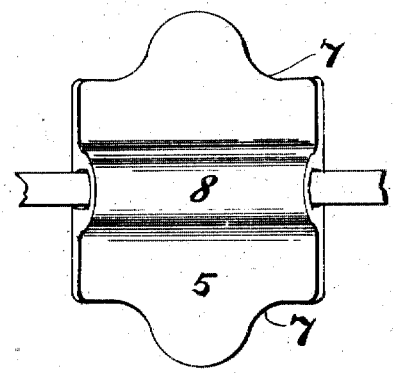
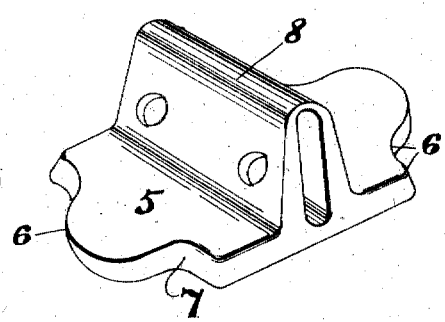

UNITED STATES PATENT OFFICE.

IRVINE BROOK, OF BRIGHOUSE, ENGLAND.

ANTISKIDDING-CHAIN.

1,282,182.      Specification of Letters Patent.      Patented Oct. 22, 1918.

Application filed August 28, 1917. Serial No. 188,614.

*To all whom it may concern:*

Be it known that I, IRVINE BROOK, motor engineer, a subject of the king of Great Britain, residing at 106 Commercial street, Brighouse, Yorkshire, England, have invented certain new and useful Improvements in Antiskidding-Chains, of which the following is a specification.

This invention refers to improvements in or relating to anti-slipping or anti-skidding devices for resilient tires for the wheels of road vehicles and in particular to such devices which consist of a series of blocks connected together and located in the annular groove or depression of a twin tread resilient tire or between two separate resilient tires *e. g.* of solid rubber.

British Patent Specification No. 8,454 of 1911 describes the application, in the annular groove or depression between the two treads of a twin-tread solid rubber tire, of a series of blocks conforming in cross-section to the shape of the groove or depression between the treads and resting therein, the said blocks being connected together to form an endless chain by means of links pivoted in openings formed longitudinally through the blocks or alternatively in recesses in the ends of the blocks, the inner faces and sides of the blocks being adapted to bear against the bottom and sides of the groove or depression between the treads and the outer faces, suitably serrated, roughened, or studded, occupying such a position relative to the crowns of the tread (*i. e.* normally slightly below the level of the latter) that on a slight or partial depression of the treads the blocks contact with the road surface.

Now the improvements according to the present invention consists in radically altering the stresses on the rubber of the tire due to the portion of the load transmitted through the blocks, by eliminating all stress on the adjacent sides of the twin treads or of the two treads of separate tires which between them form the sides and bottom of the annular groove or depression and transferring the whole portion of the load transmitted to the blocks through the crowns of the said treads.

For this purpose the inwardly projecting portions of the blocks which are necessary for the purpose of connecting the blocks together to form the endless chain and it may be for the purpose also of stiffening the tread portion and which extend into the annular groove or depression are so formed as to provide substantial clearance between the sides and ends of said portions and the sides and bottom of the annular groove or depression and the tread portions of the blocks are of such a width as to afford sufficient bearing on the crowns of the treads as aforesaid.

The edges of the blocks in the circumferential direction of the wheel may be either straight or may be given any suitable contour adapted to further prevent either slipping or skidding or both.

The blocks may be connected together to form an endless chain in any suitable and convenient manner but preferably are connected together by means of pivoted links such as described in the British Patent Specification No. 8454 of 1911 aforesaid.

The present invention is illustrated in the accompanying drawings as applied to two separate tires *i. e.* a twin tire of solid rubber.

Fig. 3 is a side elevation, partly in section, of a block, illustrating one mode of connecting the blocks together and completing the endless chain;

Figs. 4 and 5 are respectively an end elevation and a plan view of the block construction shown in Fig. 3, and Fig. 6 is a perspective view of the block.

Figure 1:
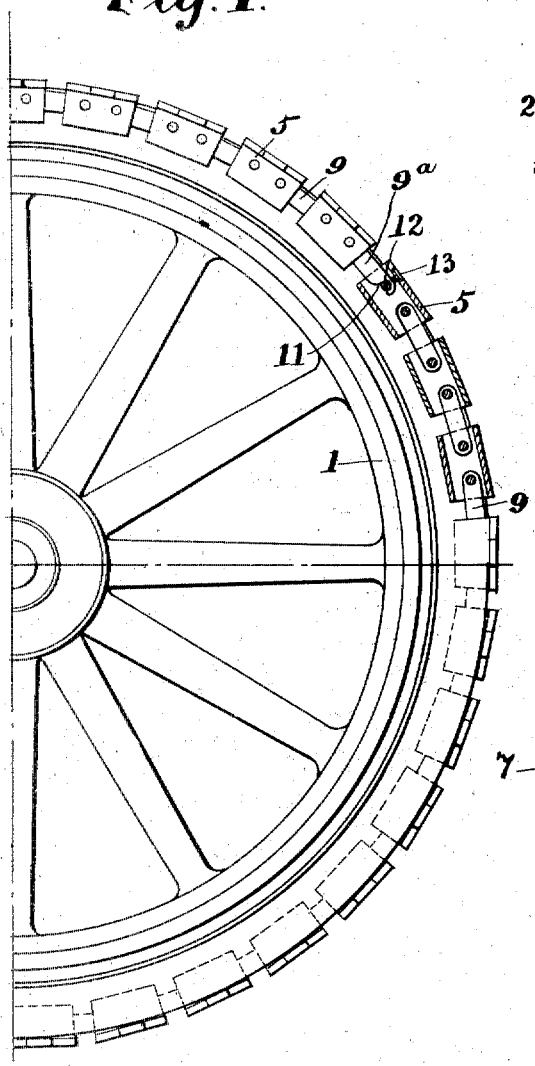
Figure 1 is a side elevation of half a wheel, partly broken away showing in place upon the wheel an endless chain of blocks—some of which are in section—constructed according to the present invention.
Figure 2:
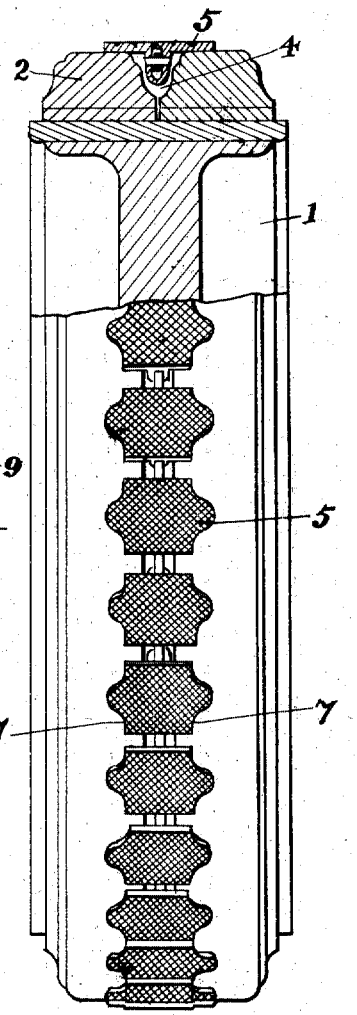
Fig. 2 is an edge view partly broken away of the wheel and chain shown in Fig. 1.

Referring to the drawings the wheel is shown as provided with two separate solid rubber tires 2 and 3 by way of example. In and across the annular groove or depression 4 between the two tires is arranged the endless chain of blocks. Each block comprises a tread portion 5 of such a width as to afford sufficient bearing on the crowns of the tires 2 and 3 and the outer surface thereof may be roughened, serrated, grooved or the like to further prevent slipping. The edge of the inner surface is preferably rounded off as shown at 6 to avoid any tendency on the part of the tread portion to cut the rubber. The edges 7 of the tread portion may, in the circumferential direction, be given any suitable contour adapted to still further prevent either slipping or skidding or both for instance as shown in Figs. 2, 4, 5 and 6.

In order that the tread portions may be connected together to form the endless chain they are provided with inwardly projecting portions extending into the groove 4. These projecting portions may be such as may be necessary for the sole purpose of forming the endless chain or, it may be, for the purpose also of stiffening the tread portions. In any case it is essential that such projecting portions should be so formed as to provide substantial clearance between the sides and the inwardly extending ends of such portions on the one hand and the sides and bottom of the groove 4 on the other hand as clearly shown in Fig. 2 so that the whole portion of the load transmitted through the tread portions 5 may be borne on the crowns of the tires 2 and 3. This condition being fulfilled the blocks may be connected together through such inwardly projecting portions as aforesaid to form the endless chain in any suitable manner. As an example the blocks are shown connected together by pivoted links as described in the aforesaid British Patent Specification No. 8,454 of 1911.

Each tread portion 5 is provided for example with an inwardly projecting U-shaped web 8 and the links 9 are pivoted between the arms of the web on rivets 10 for example. The endless chain may be completed by any suitable and convenient device. For instance as described in the aforesaid Patent Specification No. 8,454 of 1911 the last link 9ª (see Figs. 1 and 3) has one end formed with an open ended slot or recess 11 arranged in a radial direction with respect to the wheel and adapted to register over a pin rivet or the like fastening 12 extending between the arms of the web 8 on the first or adjacent block of the chain. The link 9ª is kept in position over the pin 12 by a set-screw 13 with the head countersunk into the tread portion 5.

The blocks may be made of metal or other suitable material.

Although the endless chain of blocks has been shown and described as applied to two separate solid rubber tires on the wheel of a road vehicle it is to be understood that the endless chain of blocks according to the present invention is applicable to any tire construction of the twin-tread or plural or multiple tread type.

Blocks employed and constructed according to this invention present an even and regular surface to the road and do not increase any jarring or bumping as the wheel rotates while at the same time prevent slipping or skidding.

From an inspection of Figs. 1 to 6 inclusive, it will be observed that the tread portion 5 of each block is solid and extends laterally, in opposite directions, a substantial distance from the inwardly projecting portion; or, in other words, from the connecting and strengthening portion 8, as this projecting portion has been referred to. Said portion 8 is integral with the tread portion 5, extends the full length of said tread portion 5 and is of modified V or modified U shape form, as is readily ascertainable from an inspection of Figs. 4 and 6, and it is sometimes referred to as the inwardly projecting V-shaped portion. When the blocks are in position the closed portions of the V are innermost. The inwardly projecting portions of adjacent blocks are connected by flat links, as 9, which enter the slots of said projecting portions, and it will be noted that the slots in said V-shaped portion are only a little wider than the links which enter therein. The result of this flat link construction is that each block is free to move radially inwardly, as pressure in an inward direction is applied to the blocks. Under these conditions treads of the resilient tire will yield readily inwardly behind the block. However, due to the flat link construction, it will be apparent that each block is prevented from torsional or angular movement as about a radial line passing through the block on the one hand and the center of the wheel or tire about which the endless chain is located. Such a link construction as that just described opposes or prevents any of the blocks becoming displaced or twisted in a manner to cramp or wedge against the inner sides of the portions of the tire treads defining the groove or depression 4 and thus avoids any likelihood of injury to said adjacent portions of the tire. By preventing or opposing a torsional or angular movement of the block it will be observed that the endless chain of linked-together blocks is free to creep about the periphery of the tire without imparting injury to the tire.

What I claim is:—

An endless non-skidding chain, on a resilient tire comprising a plurality of treads constructed and arranged so as to provide an annular groove or depression between adjacent treads, which chain is constructed of blocks linked together in a manner to permit an inward or radial movement of the blocks but in a manner to oppose torsional or angular movement about a radial line, each of which blocks has a solid tread portion and an inwardly projecting connecting and strengthening portion of modified V shape that enters the groove or depression between said adjacent treads with the closed portions of the V innermost, said blocks being so characterized that the tread portion of each is of sufficient width to afford suitable bearings on the crowns of adjacent treads and further so characterized that said inwardly projecting portions are so formed as to substantially clear the sides and bottom of the annular groove or depression between the treads.

IRVINE BROOK.